United States Patent
Matsunaga et al.

(10) Patent No.: US 12,240,479 B2
(45) Date of Patent: Mar. 4, 2025

(54) MOBILE OBJECT CONTROL DEVICE AND MOBILE OBJECT CONTROL METHOD

(71) Applicant: HONDA MOTOR CO., LTD., Tokyo (JP)

(72) Inventors: Hideki Matsunaga, Wako (JP); Yuji Yasui, Wako (JP); Takashi Matsumoto, Wako (JP); Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 17/702,847

(22) Filed: Mar. 24, 2022

(65) Prior Publication Data

US 2022/0315026 A1    Oct. 6, 2022

(30) Foreign Application Priority Data

Mar. 30, 2021  (JP) ................................. 2021-056995

(51) Int. Cl.
*B60W 50/12* (2012.01)
*B60W 40/105* (2012.01)
*G08G 1/01* (2006.01)

(52) U.S. Cl.
CPC .......... *B60W 50/12* (2013.01); *B60W 40/105* (2013.01); *G08G 1/0133* (2013.01); *G08G 1/0141* (2013.01); *B60W 2552/05* (2020.02)

(58) Field of Classification Search
CPC ............... B60W 50/12; B60W 40/105; B60W 2552/05; B60W 30/14; B60W 40/02;
(Continued)

(56) References Cited

U.S. PATENT DOCUMENTS 5,999,865 A  * 12/1999 Bloomquist ......... G05D 1/0248
701/25
9,576,480 B1 *  2/2017 Shoshan .......... G08G 1/096716
(Continued)

FOREIGN PATENT DOCUMENTS

CN        101401762       4/2009
CN        108885835       11/2018
(Continued)

OTHER PUBLICATIONS

Japanese Office Action for Japanese Patent Application No. 2021-056995 mailed May 21, 2024.
(Continued)

*Primary Examiner* — Kurt Philip Liethen
(74) *Attorney, Agent, or Firm* — Amin, Turocy & Watson, LLP

(57) ABSTRACT

A hardware processor of a mobile object executes the program stored in a storage device to acquire information indicating a road situation in a traveling direction of a mobile object; to recognize whether the mobile object is moving on a roadway or a predetermined region different from the roadway; to recognize presence of a contact portion between the sidewalk and the predetermined region in the traveling direction of the mobile object; to control the speed of the mobile object at least partially, and limit a speed at which the mobile object is moving on the roadway to a first speed and limit a speed at which the mobile object is moving on a sidewalk to a second speed slower than the first speed; and to bring a speed of the mobile object closer to the second speed when the mobile object is moving on the roadway, the contact portion is recognized within a predetermined range from the mobile object, and the road situation is in a predetermined state.

13 Claims, 5 Drawing Sheets

(58) Field of Classification Search
CPC .......... B60W 60/001; B60W 2300/34; B60W 60/005; B60W 30/09; B60W 40/06; G08G 1/0133; G08G 1/0141; G06V 20/588; H04W 4/44
See application file for complete search history.

(56) References Cited

U.S. PATENT DOCUMENTS

| | | | |
|---|---|---|---|
| 10,403,133 B1* | 9/2019 | Christensen | G01C 21/3492 |
| 10,915,762 B1* | 2/2021 | Russell | G06V 40/103 |
| 11,454,510 B1* | 9/2022 | Gray | G07C 5/008 |
| 2011/0210867 A1* | 9/2011 | Benedikt | G08G 1/01 340/905 |
| 2019/0061749 A1 | 2/2019 | Fukumoto et al. | |
| 2019/0111925 A1* | 4/2019 | Sata | B60W 10/30 |
| 2020/0198658 A1* | 6/2020 | Suzuki | B60W 10/30 |
| 2020/0290643 A1 | 9/2020 | Ueda et al. | |
| 2021/0034156 A1* | 2/2021 | Drayna | G06F 3/017 |
| 2021/0064030 A1* | 3/2021 | Jiang | B60W 60/001 |
| 2021/0188225 A1* | 6/2021 | Van Hoecke | H04W 4/023 |
| 2022/0036747 A1* | 2/2022 | Ortman | G05D 1/106 |

FOREIGN PATENT DOCUMENTS

| | | |
|---|---|---|
| CN | 111133489 | 5/2020 |
| CN | 112141124 | 12/2020 |
| EP | 2045178 | 4/2009 |
| JP | 2009-089758 | 4/2009 |
| JP | 2010086269 A * | 4/2010 |
| JP | 2011-075474 | 4/2011 |
| JP | 2016-212120 | 12/2016 |
| JP | 2017-100490 | 6/2017 |
| JP | 2018-036134 | 3/2018 |
| JP | 2020-121573 | 8/2020 |
| JP | 2020-185889 | 11/2020 |
| JP | 2020-189536 | 11/2020 |

OTHER PUBLICATIONS

Chinese Office Action for Chinese Patent Application No. 202210154533.X mailed Nov. 26, 2024.

* cited by examiner

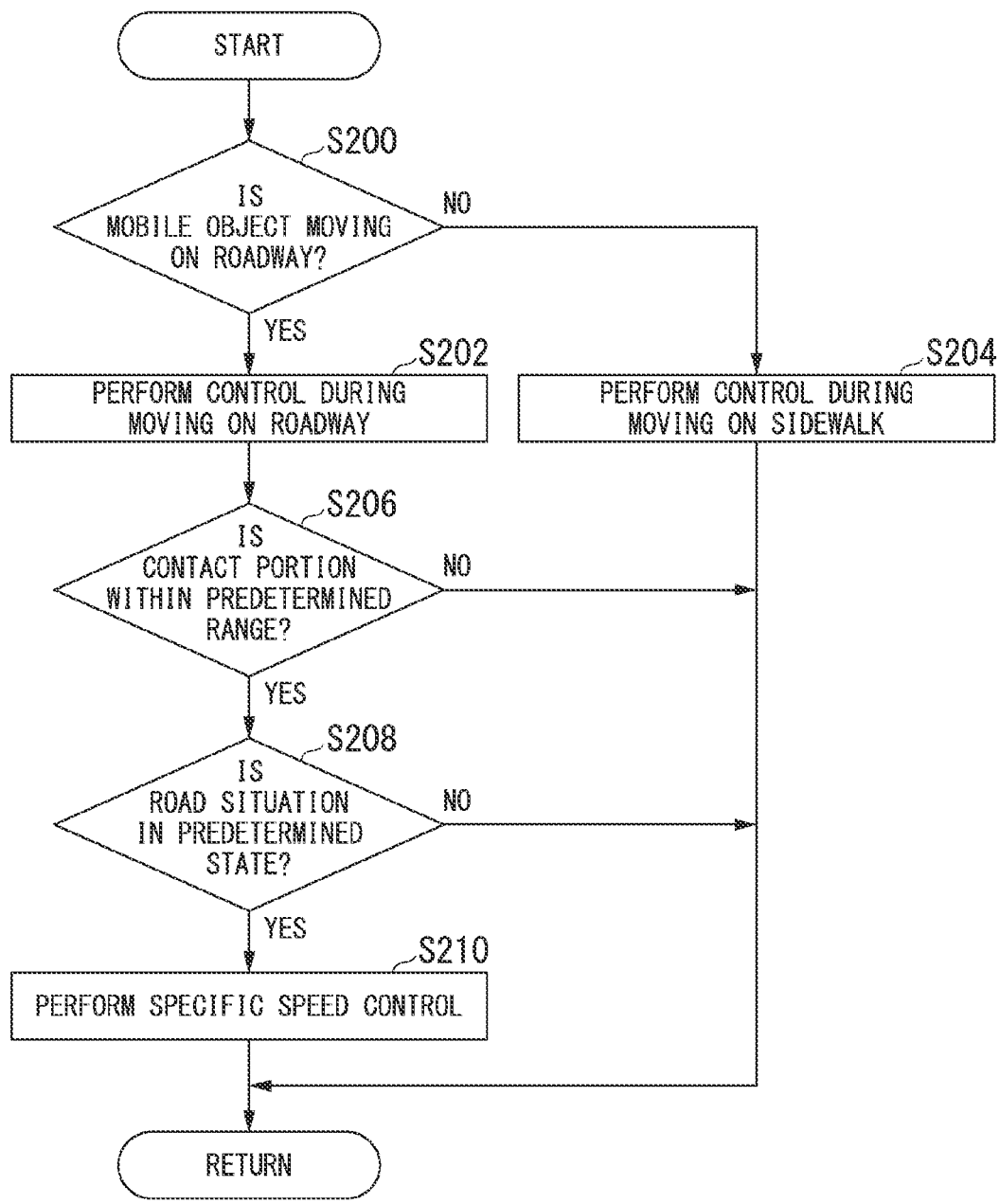

MOBILE OBJECT CONTROL DEVICE AND MOBILE OBJECT CONTROL METHOD

CROSS-REFERENCE TO RELATED APPLICATION

Priority is claimed on Japanese Patent Application No. 2021-056995, filed Mar. 30, 2021, the content of which is incorporated herein by reference.

BACKGROUND

Field of the Invention

The present invention relates to a mobile object control device and a mobile object control method.

Description of Related Art

In the related art, the invention of a one-person riding electromotive vehicle capable of moving on a sidewalk has been disclosed (see Japanese Unexamined Patent Application, First Publication No. 2020-189536).

SUMMARY

Technologies of the related art have not taken into account mobile objects capable of moving on both roadways and predetermined regions different from roadways. Therefore, appropriate control cannot be performed at the time of entrance to predetermined regions from roadways in some cases.

The present invention is devised in view of such circumstances and an objective of the present invention is to provide a mobile object control device and a mobile object control method capable of appropriately controlling a mobile object capable of moving on both a roadway and a predetermined region different from the roadway at the time of entrance to a predetermined region from a roadway.

A driving support device, a mobile object control device and a mobile object control method according to the present invention adopt the following configurations.

(1) According to an aspect of the present invention, a mobile object control device includes a storage device storing a program and a hardware processor. The hardware processor executes the program stored in the storage device to: acquire information indicating a road situation in a traveling direction of a mobile object; recognize whether the mobile object is moving on a roadway or a predetermined region different from the roadway; recognize presence of a contact portion between the predetermined region and the roadway in the traveling direction of the mobile object; control the speed of the mobile object at least partially, and limit a speed at which the mobile object is moving on the roadway to a first speed and limit a speed at which the mobile object is moving on a sidewalk to a second speed slower than the first speed; and bring a speed of the mobile object closer to the second speed when the mobile object is moving on the roadway, the contact portion is recognized within a predetermined range from the mobile object, and the road situation is in a predetermined state.

(2) In the mobile object control device according to the aspect (1), the hardware processor may question about an intention to enter the predetermined region using an interface device when the mobile object is moving on the roadway, the contact portion is recognized within a first predetermined range from the mobile object, and the road situation is a predetermined state. A speed of the mobile object may be brought closer to the second speed when a positive response is obtained.

(3) In the mobile object control device according to the aspect (1), the hardware processor may determine that the road situation is a predetermined state when it is recognized based on the acquired information that a dead end is within a second predetermined range in the traveling direction of the mobile object.

(4) In the mobile object control device according to the aspect (1), the hardware processor may determine that the road situation is a predetermined state when it is recognized based on the acquired information that a construction site is within a second predetermined range in the traveling direction of the mobile object.

(5) In the mobile object control device according to the aspect (1), the hardware processor may determine that the road situation is a predetermined state when it is recognized based on the acquired information that traffic congestion occurs within a second predetermined range in the traveling direction of the mobile object.

(6) In the mobile object control device according to the aspect (1), the hardware processor may determine that the road situation is a predetermined state when it is recognized based on the acquired information that a speed of another mobile object moving in the same direction as the mobile object is greater than a threshold A within a second predetermined range in the traveling direction of the mobile object.

(7) In the mobile object control device according to the aspect (1), the hardware processor may determine that the road situation is a predetermined state when it is recognized based on the acquired information that a predetermined number of types or more of mobile objects coexist within a second predetermined range in the traveling direction of the mobile object.

(8) In the mobile object control device according to the aspect (1), the hardware processor may determine that the road situation is a predetermined state when it is recognized based on the acquired information that the number of large vehicles is equal to or greater than a threshold B within a second predetermined range in the traveling direction of the mobile object.

(9) In the mobile object control device according to the aspect (1), the hardware processor may recognize whether the mobile object is moving on the roadway or the predetermined region based on an output of an outside world detection device detecting an outside situation of the mobile object.

(10) In the mobile object control device according to the aspect (1), the hardware processor may recognize whether the mobile object is moving on the roadway or the predetermined region based on a manipulation of an occupant of the mobile object on a switch provided inside the mobile object.

(11) In the mobile object control device according to the aspect (1), when the hardware processor may recognize that the mobile object is moving on the predetermined region, the hardware processor causes an external report device to report the mobile object which is moving on the predetermined region to the outside of the mobile object.

(12) According to another aspect of the present invention, a mobile object control method is performed by a computer controlling a mobile object which is capable of moving both on a roadway and a predetermined region different from the roadway. The method includes: acquiring information indicating a road situation in a traveling direction of a mobile object; recognizing whether the mobile object is moving on a roadway or a predetermined region; recognizing presence of a contact portion between the roadway and the predetermined region in the traveling direction of the mobile object; controlling the speed of the mobile object at least partially; limiting a speed at which the mobile object is moving on the roadway to a first speed; limiting a speed at which the mobile object is moving on the predetermined region to a second speed slower than the first speed; and bringing the speed of the mobile object closer to the second speed when the mobile object is moving on the roadway, the contact portion is recognized within a first predetermined range from the mobile object, and the road situation is a predetermined state.

(13) According to still another aspect of the present invention, a mobile object control device includes a storage device storing a program and a hardware processor. The hardware processor executes the program stored in the storage device to: acquire information indicating a road situation in a traveling direction of a mobile object; recognize whether the mobile object is moving on a roadway or a predetermined region different from the roadway; recognize presence of a contact portion between the roadway and the predetermined region in the traveling direction of the mobile object; control the speed of the mobile object at least partially, and limit a speed at which the mobile object is moving on the roadway to a first speed and limit a speed at which the mobile object is moving on a sidewalk to a second speed slower than the first speed; and suggest deceleration to an occupant of the mobile object using an interface device when the mobile object is moving on the roadway, the contact portion is recognized within a predetermined range from the mobile object, and the road situation is in a predetermined state.

(14) According to still another aspect of the present invention, a mobile object control method is performed by a computer controlling a mobile object on which at least one occupant gets and which is capable of moving both on a roadway and a predetermined region different from the roadway. The method includes: acquiring information indicating a road situation in a traveling direction of a mobile object; recognizing whether the mobile object is moving on a roadway or a predetermined region; recognizing presence of a contact portion between the roadway and the predetermined region in the traveling direction of the mobile object; controlling the speed of the mobile object at least partially; limiting a speed at which the mobile object is moving on the roadway to a first speed; limiting a speed at which the mobile object is moving on the predetermined region to a second speed slower than the first speed; and suggesting deceleration to the occupant using an interface device when the mobile object is moving on the roadway, the contact portion is recognized within a first predetermined range from the mobile object, and the road situation is in a predetermined state.

According to the aspects (1) to (14), it is possible to appropriately control a mobile object capable of moving on both a roadway and a predetermined region different from the roadway at the time of entrance to a predetermined region from a roadway.

BRIEF DESCRIPTION OF THE DRAWINGS

FIG. 7 is a flowchart illustrating an example of a flow of a process performed by the control device according to the embodiment.

DETAILED DESCRIPTION

Hereinafter, an embodiment of a mobile object control device, a mobile object control method, and a storage medium according to the present invention will be described with reference to the drawings. A mobile object moves on both a roadway and a predetermined region different from the roadway. The predetermined region is, for example, a sidewalk. The predetermined region may be some or all of a roadside strip, a bicycle lane, a public open space, and the like or may include all of a sidewalk, a roadside strip, a bicycle lane, and a public open space. In the following description, the predetermined region is assumed to be a sidewalk. In the following description, a portion described as a "sidewalk" can be appropriately replaced with the "predetermined region."

First Embodiment

Figure 1:
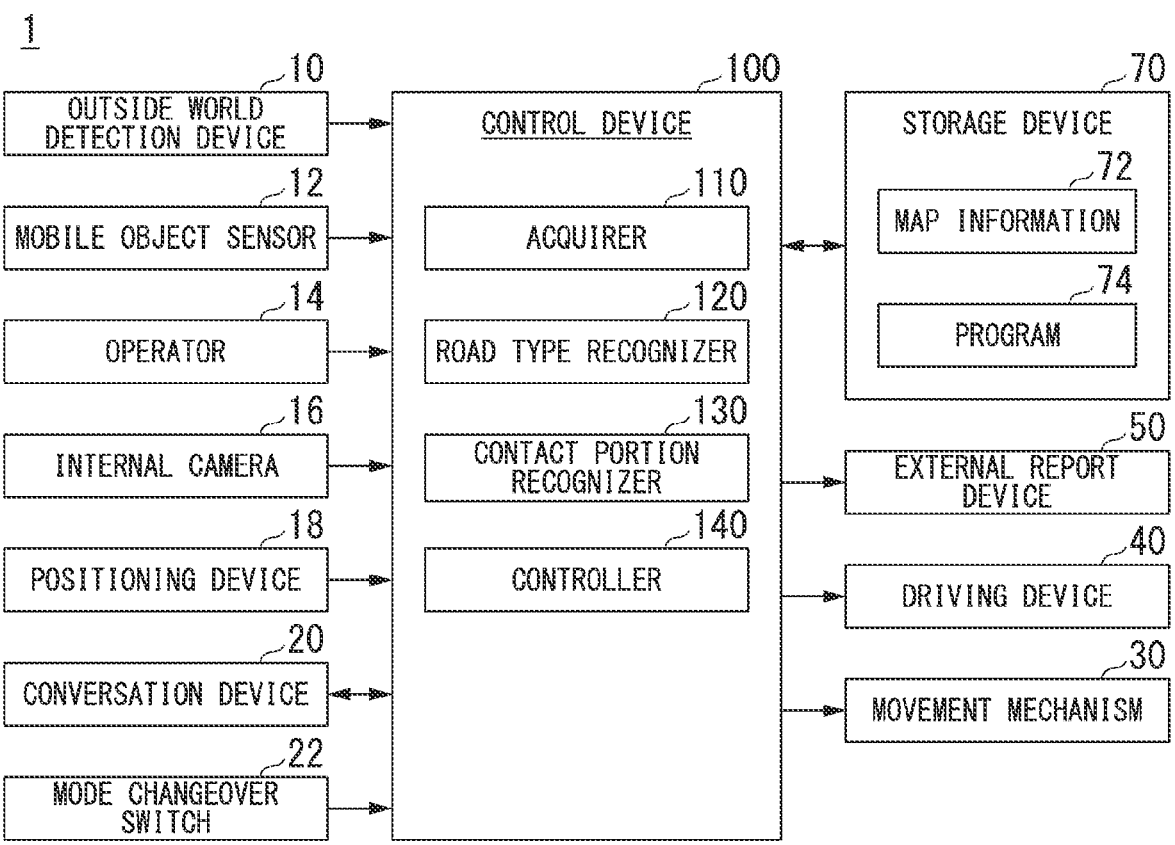
FIG. 1 is a diagram illustrating an exemplary configuration of a mobile object and a control device according to an embodiment.

FIG. 1 is a diagram illustrating an exemplary configuration of a mobile object 1 and a control device 100 according to an embodiment. In the mobile object 1, for example, an outside world detection device 10, a mobile object sensor 12, an operator 14, an internal camera 16, a positioning device 18, a conversation device 20, a mode changeover switch 22, a movement mechanism 30, a driving device 40, an external report device 50, a storage device 70, and a control device 100 are mounted. Of these constituents, some of the constituents unnecessary to implement functions of the present invention may be omitted.

The outside world detection device 10 is any of various devices in which a traveling direction of the mobile object 1 is a detection range. The outside world detection device 10 includes an external camera, a radar device, a light detection and ranging (LIDAR) device, and a sensor fusion device. The outside world detection device 10 outputs information (an image, a position of an object, or the like) indicating a detection result to the control device 100.

The mobile object sensor 12 includes, for example, a speed sensor, an acceleration sensor, a yaw rate (angular velocity) sensor, an azimuth sensor, and a manipulation amount detection sensor or the like mounted on the operator 14. The operator 14 includes, for example, an operator (for example, an accelerator pedal or a brake pedal) for giving an instruction for an acceleration or deceleration speed and an operator (for example, a steering wheel) for giving an instruction for steering. In this case, the mobile object sensor 12 may include an accelerator opening sensor, a brake step sensor, and a steering torque sensor. The mobile object 1 may include an operator (for example, a rotational operator with no annular shape, a joystick, a button, or the like) other than the above sensor as the operator 14.

The internal camera 16 images at least the head of an occupant of the mobile object 1 in front. The internal camera 16 is a digital camera using an image sensor such as a charge coupled device (CCD) camera or a complementary metal oxide semiconductor (CMOS) camera. The internal camera 16 outputs captured images to the control device 100.

The positioning device 18 is a device that locates a position of the mobile object 1. The positioning device 18 is for example, global navigation satellite system (GNSS) receiver, identifies a position of the mobile object 1 based on signals received from GNSS satellites, and outputs the position as positional information. The positional information of the mobile object 1 may be estimated from a position of a Wi-Fi base station to which a communication device to be described below is connected.

The conversation device 20 includes, for example, a speaker, a microphone, a touch panel, and a communication device. The conversation device 20 appropriately processes a vocal sound of an occupant corrected by a microphone, transmits the processed vocal sound to a server device using a communication device via a network, and supplies information regarding the vocal sound from a speaker based on information replied from the server device. The conversation device 20 is also called an agent device, a concierge device, an assistance device, or the like in some cases. The server device has a sound recognition function, a natural language processing function, a meaning interpretation function, a reply content determination function, and the like. The conversation device 20 may transmit the positional information to the server device and the server device may reply with the positional information and information of facility corresponding to a guidance request (for example, "Where is a delicious noodle shop nearby?") coming from an occupant. In this case, a sound guidance such as "If you turn left ahead, it is there" is performed by the conversation device 20. The present invention is not limited thereto. The conversation device 20 has a function of receiving a natural speech from an occupant and returning an appropriate reply. The conversation device 20 may have a function of performing a simple conversation without involvement with the server device, such as a function of asking a question from a device side and receiving a reply, and thus may question an occupant in response to a request from the control device 100. The conversation device 20 is an example of an interface device.

The mode changeover switch 22 is a switch manipulated by an occupant. The mode changeover switch 22 may be a mechanical switch or may be a graphical user interface (GUI) switch set on a touch panel. The mode changeover switch 22 receives a manipulation of switching a driving mode to any one of, for example, mode A which is a speed assistance mode in which a steering manipulation is performed by an occupant and acceleration or deceleration speed control is automatically performed; mode B which is a manual driving mode in which a steering manipulation and an acceleration or deceleration speed manipulation are performed by an occupant, and mode C which is an automated driving mode in which manipulation control and acceleration or deceleration speed control are automatically performed.

The movement mechanism 30 is a mechanism that moves the mobile object 1 on a road. The movement mechanism 30 is, for example, a wheel group including a steering wheel and driving wheel. The movement mechanism 30 may be each section for multiped walking.

The driving device 40 outputs a force to the movement mechanism 30 to move the mobile object 1. For example, the driving device 40 includes a motor driving the driving wheel, a battery storing power to be supplied to the motor, and a steering device that adjust a steering angle of the steering wheel. The driving device 40 may include an internal combustion engine or a fuel cell as a driving power output unit or a power generation unit. The driving device 40 may further include a brake device operating with a frictional force or air resistance.

The external report device 50 is provided in an external plate unit of the mobile object 1 and is, for example, a lamp, a display device, a speaker, or the like for reporting information to the outside of the mobile object 1. The external report device 50 performs different operations between a state in which the mobile object 1 is moving on a sidewalk and a state in which the mobile object 1 is moving on a roadway. For example, the external report device 50 performs control such that a lamp is caused to emit light when the mobile object 1 is moving on a sidewalk, and the lamp is caused not to emit light when the mobile object 1 is moving on a roadway. The color of the light emitted from the lamp may be appropriate color determined by laws. When the external report device 50 is a display device, the external report device 50 displays an indication of "traveling on a sidewalk" in text or a graph in a case in which the mobile object 1 is traveling on a sidewalk.

Figure 2:
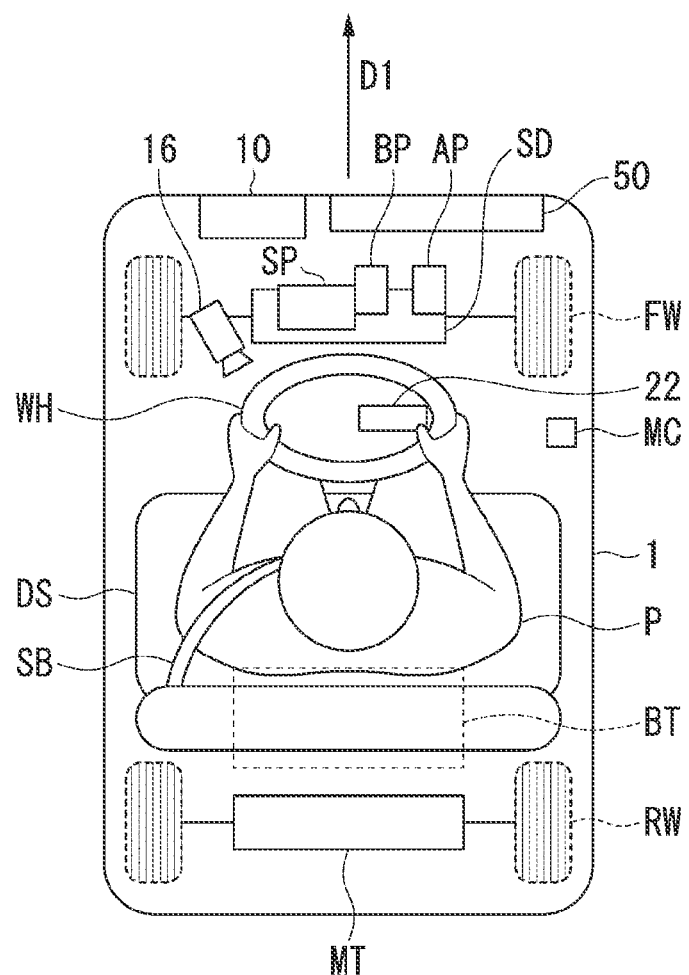
FIG. 2 is a perspective view illustrating the mobile object when viewed from the upper side.

FIG. 2 is a perspective view illustrating the mobile object 1 when viewed from the upper side. In the drawing, FW denotes a steering wheel, RW denotes a driving wheel, SD is a steering device, MT denotes a motor, and BT denotes a battery. AP denotes an accelerator pedal, BP denotes a brake pedal, WH denotes a steering wheel, SP denotes a speaker, and MC denotes a microphone. The illustrated mobile object 1 is a one-person riding mobile object and an occupant P sits on a driving seat DS and a seat belt SB is fastened. An arrow D1 indicates a traveling direction (a velocity vector) of the mobile object 1. The outside world detection device 10 is provided near a front edge of the mobile object 1, the internal camera 16 is provided at a position at which the head of the occupant P can be imaged from the front of the occupant P, and the mode changeover switch 22 is provided in each of a boss section of the steering wheel WH. The external report device 50 is provided as a display device near a front edge of the mobile object 1.

Referring back to FIG. 1, the storage device 70 is, for example, a non-transitory storage device such as a hard disk drive (HDD), a flash memory, or a random access memory (RAM). The storage device 70 stores map information 72, a program 74 which is executed by the control device 100, and the like. In the drawing, the storage device 70 is illustrated outside of a range of the control device 100, but the storage device 70 may be included in the control device 100.

Control Device

The control device 100 includes, for example, an acquirer 110, a road type recognizer 120, a contact portion recognizer 130, and a controller 140. For example, a hardware processor such as a central processing unit (CPU) executes the program (software) 74 for implementation. Some or all of the constituent elements may be implemented by hardware (a circuit unit including circuitry) such as a large scale integration (LSI), an application specific integrated circuit (ASIC), a field-programmable gate array (FPGA), or a graphics processing unit (GPU) or may be implemented by software and hardware in cooperation. The program may be stored in advance in the storage device 70 or may be stored in a detachably mounted storage medium such as a DVD or a CD-ROM so that the storage medium (a non-transitory storage medium) is mounted on a drive device to be installed on the storage device 70.

The acquirer 110 acquires information indicating a road situation in a traveling direction of the mobile object 1. The information indicating the road situation includes, for example, (1) presence or absence of a dead end and (2) presence or absence of a construction site. The information indicating the road situation may include information regarding other mobile objects in the traveling direction of the mobile object 1. For example, the information indicating the road situation may include (3) information indicating presence or absence of traffic congestion, (4) a speed (which may be, for example, a statistical value such as an average speed or a median speed) of other mobile objects moving in the same direction of the mobile object 1 in the traveling direction of the mobile object 1, and (5) types of other mobile objects (large vehicles, special vehicles, normal vehicles, two-wheeled vehicles, bicycles). The acquirer 110 acquires some or all of (1) to (5) or the same kinds of other information as information indicating the road situation in the traveling direction of the mobile object 1.

For the presence or absence of a dead end or a construction site, the acquirer 110 acquires information, for example, by analyzing an image captured by an external camera of the outside world detection device 10. For example, when image is input, the acquirer 110 acquires information indicating the presence or absence of a dead end or a construction site by inputting the image captured by the external camera to a learned model that is leaned so that the information indicating the presence or absence of the dead end or the construction site is output. Instead of (or in addition to) this, the acquirer 110 may acquire the information indicating the presence or absence of a dead end or a construction site from an external device providing traffic information via a communication device (not illustrated: a communication device included in the conversation device 20 may be used). The acquirer 110 may acquire the information indicating the presence or absence of a dead end or a construction site by applying a position of the mobile object 1 to the map information 72. As the dead end, there are a dead end in a road structure and a dead end at which passage is not temporarily permitted. In the latter, the map information 72 is not described in some cases. Therefore, it may be necessary to analyze image, for example.

For other mobile objects, the acquirer 110 acquires information, for example, by analyzing an image captured by the external camera of the outside world detection device 10. For example, when images are input, the acquirer 110 acquires information indicating presence, positions, types, or the like of the other mobile objects by inputting the images captured by the external camera to a learned model that is leaned so that the information indicating the presence, positions, types, or the like of the other mobile objects is output. The types of other mobile objects can also be estimated based on sizes in the images or intensity or the like of reflected waves received by the radar device of the outside world detection device 10. For example, the acquirer 110 acquires speeds of the other mobile objects detected using Doppler shift by the radar device.

The road type recognizer 120 recognizes whether the mobile object 1 is moving on a roadway or a sidewalk. The road type recognizer 120 recognizes whether the mobile object 1 is moving on a roadway or a sidewalk, for example, by analyzing an image captured by an external camera of the outside world detection device 10. An example of image analysis includes semantic segmentation. The road type recognizer 120 classifies pixels of a frame of an image into classes (roadways, sidewalks, boundaries, obstacles, and the like) and performs labeling, recognizes that the mobile object 1 is moving on a roadway when the number of pixels labeled as a roadway in a region equivalent to a front face of the mobile object 1 is large, and recognizes that the mobile object 1 is moving on a sidewalk when the number of pixels in which a label of the sidewalk is granted to a region equivalent to the front face of the mobile object 1 is large in the image. The present invention is not limited thereto. When the road type recognizer 120 recognizes a vehicle in a region equivalent to the front face of the mobile object 1 in the image, the road type recognizer 120 may recognize that the mobile object 1 is moving in the roadway. When the road type recognizer 120 recognizes a pedestrian in a region equivalent to the front face of the mobile object 1 in the image, the road type recognizer 120 may recognize that the mobile object 1 is moving on the sidewalk. When the width of a road surface region which is in the region equivalent to the front face of the mobile object 1 in the image is large, the road type recognizer 120 may recognize that the mobile object 1 is moving on the roadway. When the width of the road surface region which is in the region equivalent to the front face of the mobile object 1 in the image is small, the road type recognizer 120 may recognize that the mobile object 1 is moving on the sidewalk. The road type recognizer 120 may combine positional information of the mobile object 1 and the map information 72 and recognize whether the mobile object 1 is moving on a roadway or a sidewalk. In this case, it is necessary for the map information to have accuracy to the degree that the roadway and the sidewalk can be distinguished from each other from positional coordinates. When there is no "predetermined region" in a sidewalk, the road type recognizer 120 performs a similar process on a roadside strip, a bicycle lane, a public open space, or the like.

Figure 3:
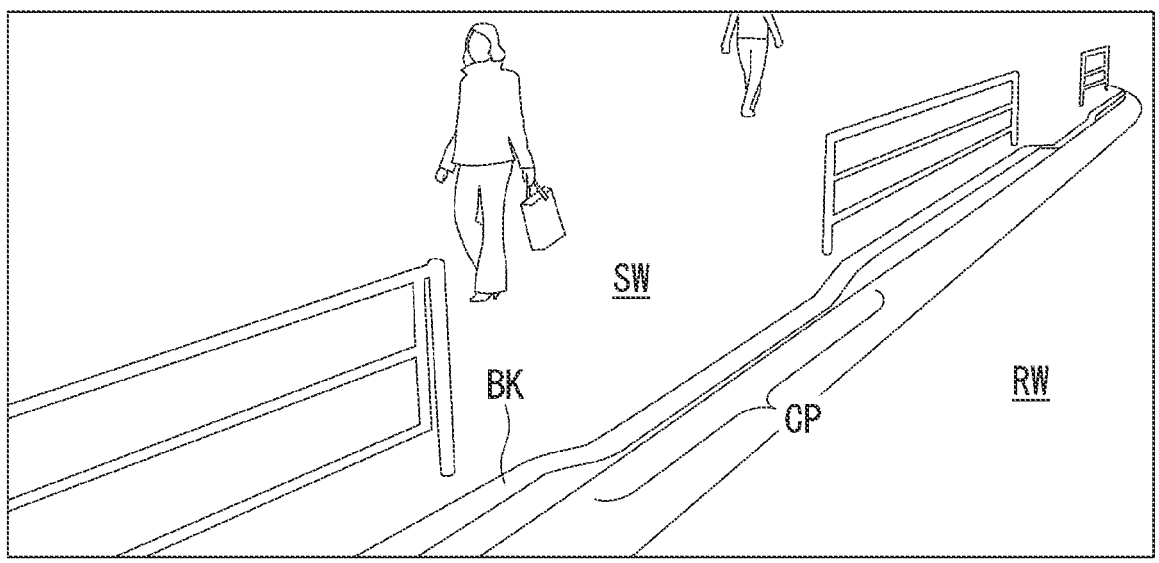
FIG. 3 is a diagram illustrating an exemplary shape of a contact portion.
Figure 4:
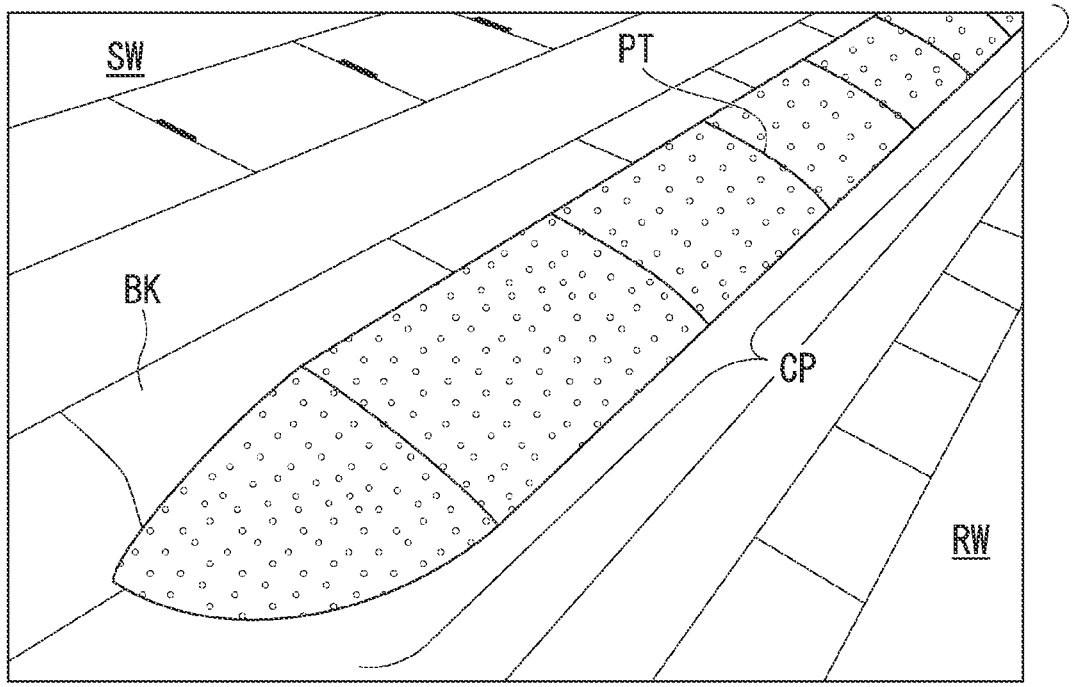
FIG. 4 is a diagram illustrating an exemplary shape of the contact portion.
Figure 5:
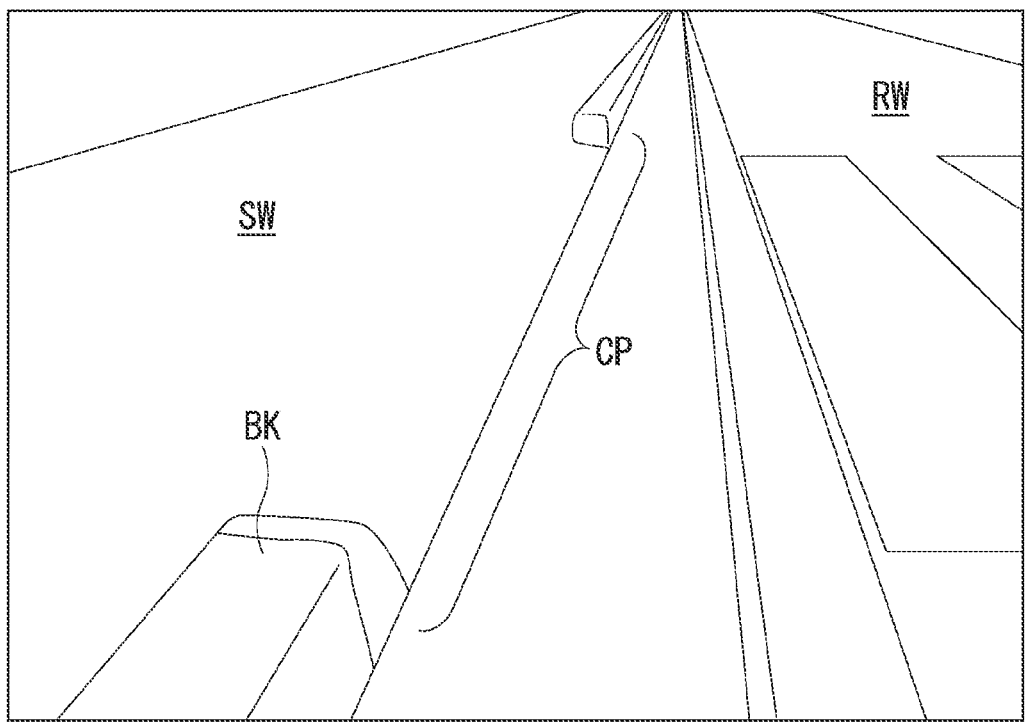
FIG. 5 is a diagram illustrating an exemplary shape of the contact portion.

The contact portion recognizer 130 recognizes presence of a contact portion between a sidewalk and a roadway in a traveling direction of the mobile object. The contact portion is provided at a boundary between a sidewalk and a roadway and is a portion in which a load is less than in other portions of the boundary when the mobile object passes through. For example, when there is a step difference in the boundary between the sidewalk and the roadway, a portion (including a portion in which the sidewalk is flush with the roadway) in which the step difference is alleviated. FIGS. 3 to 5 are diagrams illustrating an exemplary shape of a contact portion. As illustrated in FIG. 3, the contact portion CP is, for example, a portion in which a block BK of the boundary is lowered together with a sidewalk SW. In the drawing, RW denotes a roadway. As illustrated in FIG. 4, the contact portion CP may be a portion in which a step difference canceling plate PT with which the step difference between the roadway RW and the sidewalk SW is buried is placed. As illustrated in FIG. 5, the contact portion CP may be a portion in which the block BK where there is a step difference between the roadway RW and the sidewalk SW is missing. Apart from these exemplified shapes, the contact portion CP with any of various shapes is assumed. The contact portion CP may be present not only in a portion along the way of a road but also in an intersection or the like. For example, when an image is input, the contact portion recognizer 130 recognizes presence of the contact portion CP by inputting an image captured by an external camera to a learned model that is learned so that information indicating a position of the contact portion CP is output. The contact portion recognizer 130 may recognize presence of the contact portion CP based on the shape of a step difference obtained as a result by performing scanning obliquely downward with an LIDAR.

For example, the controller 140 controls the driving device 40 in accordance with a set driving mode.

In mode A, the controller 140 controls the driving device 40 such that a distance from an object in front of the mobile object 1 is kept to be a constant value or more when the mobile object 1 is moving on a roadway, and the mobile object 1 is moving at a first speed V1 (for example, a speed equal to or greater than 10 [km/h] and less than tens of [km/h]) when the distance from the object in front of the mobile object 1 is sufficiently long. The controller 140 controls the driving device 40 such that the distance from the object in front of the mobile object 1 is kept to be a constant value or more when the mobile object 1 is moving on a sidewalk, and the mobile object 1 is moving at a second speed V2 (for example, a speed less than 10 [km/h]) when the distant to the object in front of the mobile object 1 is sufficiently long. This function is similar to an adaptive cruise control (ACC) function of a vehicle moving at a speed set as the first speed V1 or the second speed V2 and a technology used for ACC can be used. In mode A, the controller 140 controls a steering angle of a steering wheel based on a manipulation amount of the operator 14 such as a steering wheel. This function is a similar to a function of a power steering device and a technology used for a power steering device can be used. Without performing electronic control on steering, the mobile object 1 may include a steering device to which the operator 14 and the steering mechanism are mechanically connected.

In mode B, the controller 140 controls the driving device 40 based on a speed of the mobile object 1 and a manipulation amount of an accelerator pedal or a brake pedal. The controller 140 controls the driving device 40 such that the first speed V1 is set an upper limit of the speed when the mobile object 1 is moving on a roadway (in the case of mode B, a case in which the speed reaches an upper limit of the speed means that the mobile object 1 cannot be accelerated even if an instruction for further acceleration is given). The controller 140 controls the driving device 40 such that the second speed V2 is set as the upper limit of the speed when the mobile object 1 is moving on a sidewalk. Steering is similar to that of mode A.

In mode C, the controller 140 controls the driving device 40 such that a course and obstacles are detected based on an output of the outside world detection device 10, a target trajectory along which the mobile object 1 can move while avoiding obstacles in the course is generated, and the mobile object 1 moves along the target trajectory. Even in mode C, the controller 140 controls the driving device 40 such that the first speed V1 is set as the upper limit of the speed when the mobile object 1 is moving on a roadway. The controller 140 controls the driving device 40 such that the second speed V2 is set as the upper limit of the speed when the mobile object 1 is moving on a sidewalk. Since mode C is not a core of the present invention, more detailed description will be omitted.

Control in Accordance with Presence of Contact Portion

Hereinafter, control in accordance with presence of a contact portion by the controller 140 will be described in order from mode A. In mode A, the controller 140 brings a speed of the mobile object 1 closer to the second speed V2 from the first speed V1 when the mobile object 1 is moving on a roadway, a contact portion is recognized within a predetermined range from the mobile object 1, and a road situation acquired in the information by the acquirer 110 is in a predetermined state. "Bringing of the speed of the mobile object 1 closer to the second speed V2 from the first speed V1" means deceleration of the mobile object 1 except for a case in which the mobile object 1 is moving at a low speed or stops in accordance with presence of an unexpected obstacle. At this time, the controller 140 may ask a question about an intention of the occupant to enter a sidewalk using the conversation device 20, may bring the speed of the mobile object 1 closer to the second speed V2 when a positive reply is obtained, and may not bring the speed of the mobile object 1 closer to the second speed V2 when a positive reply is not obtained. Hereinafter, irrespective of whether there is a question, "bringing of the speed of the mobile object 1 closer to the second speed V2 from the first speed V1 when the mobile object 1 is moving on a roadway, a contact portion is recognized within a predetermined range from the mobile object 1, and the road situation is in the predetermined state" is referred to as "specific speed control."

The "predetermined state" refers to, for example, some or all of the following events. Information serving as a reference for determining whether the road situation is in the predetermined state is acquired by the acquirer 110 and is delivered to the controller 140, as described above.

(A) The predetermined state is, for example, a state in which a dead end is within a second predetermined range (for example, within a second predetermined distance X2 of about tens to hundreds of [m]: the same applies below) in the traveling direction of the mobile object 1. In this state, it is estimated that the occupant P considers to move on a sidewalk.

(B) The predetermined state is, for example, a state in which a construction site is within the second predetermined range in the traveling direction of the mobile object 1. In this state, it is estimated that the occupant P considers to move on a sidewalk.

(C) The predetermined state is, for example, a state in which traffic congestion occurs within the second predetermined range in the traveling direction of the mobile object 1. For example, when the number of other mobile objects within the second predetermined range in the traveling direction of the mobile object 1 is greater than a first threshold (for example, tens of mobile objects) and an average speed thereof is less than a second threshold (for example, a speed of about 20 [km/h]), the controller 140 determines that traffic congestion occurs within a predetermined range in the traveling direction of the mobile object 1. This determination process may be performed by the acquirer 110. In this state, a speed is not much changed although either a sidewalk or a roadway is used. Therefore, it is highly likely that the occupant P considers to move on a sidewalk.

(D) The predetermined state is, for example, a state in which a speed (for example, a statistical value such as an average speed or a median speed) of other mobile objects moving in the same direction as the mobile object 1 within the second predetermined range in the traveling direction of the mobile object 1 is greater than a third threshold (an example of a threshold A: for example, a value of about 70 [km/h]). In this state, a probability of the mobile object 1 using a broad road such as a main road is high. Thus, since it is supposed that the mobile object 1 uses a roadway at a relatively low speed, there is a high possibility of the occupant P considering that he or she does not feel stress when the mobile object is moving on a sidewalk.

(E) The predetermined state is, for example, a state in which a predetermined number of types of other mobile objects coexist among other mobile objects moving in the same direction as the mobile object 1 within the second predetermined range in the traveling direction of the mobile object 1. For example, the controller 140 determines that the road situation is in the predetermined state when a predetermined number of types (for example, three or more types) of mobile objects are included among other mobile objects moving in the same direction as the mobile object 1 within the second predetermined range in the traveling direction of the mobile object 1. In this state, since a plurality of types of other mobile objects traveling at different speeds are present nearby, it is relatively difficult to maneuver the mobile object 1. Therefore, there is a high possibility of the occupant P considering that he or she does not feel stress when the mobile object is moving on a sidewalk.

(F) The predetermined state is, for example, a state in which the number of large vehicles is equal to or greater than a fourth threshold (an example of a threshold B: for example, about one to five large vehicles) among other mobile objects moving in the same direction of the mobile object 1 within the second predetermined range in the traveling direction of the mobile object 1. The large vehicles may include special vehicles.

Figure 6:
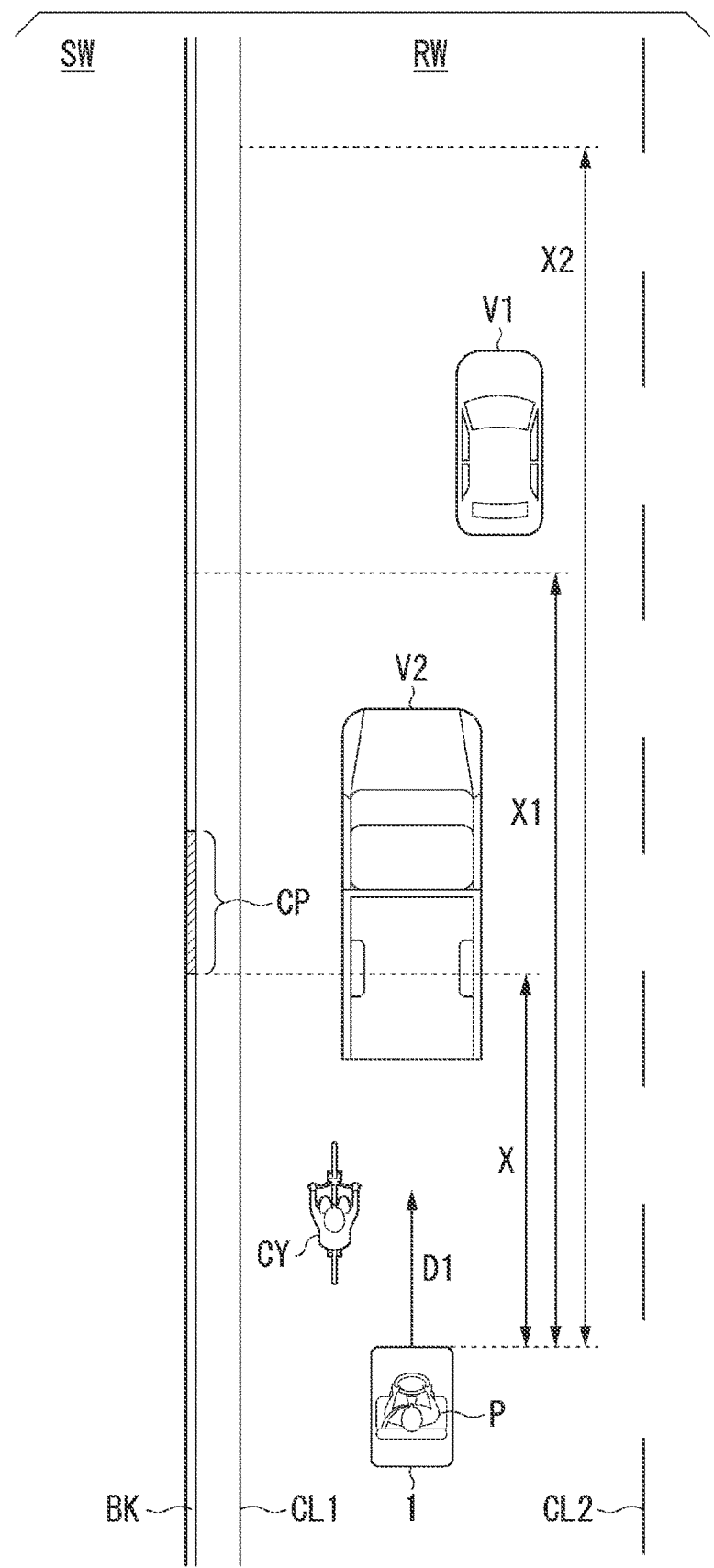
FIG. 6 is a diagram illustrating an example of a scenario in which a specific speed is controlled.

FIG. 6 is a diagram illustrating an example of a scenario in which a specific speed is controlled. In the drawing, X denotes a distance between the mobile object 1 and the contact portion CP. CL1 is a white line indicating a left end of the roadway RW and CL2 is a dashed line demarcating a lane in which there is the mobile object 1 and an opposing lane. The distance X is defined as, for example, a distance between a position of a frontmost side of the contact portion CP and a front end of the mobile object 1. However, the present invention is not limited thereto and any distance such as a distance between the middle of the contact portion CP and the center of the mobile object 1 may be defined. In the drawing, a normal vehicle V1, a large vehicle V2, and a bicycle CY are within a second predetermined distance X2 from the mobile object 1. Specific speed control is performed when a distance X1 is equal to or less than a first predetermined distance X1 (for example, the contact portion CP is within a first predetermined range from the mobile object 1) and a predetermined number of types of other mobile objects coexist among other mobile objects moving in the same direction as the mobile object 1 within a second predetermined range (within a range up to the second predetermined distance X2) in the traveling direction of the mobile object 1. The first predetermined distance may be shorter than or the same as the second predetermined distance.

In mode B, the controller 140 gradually switches the upper limit of the speed of the mobile object 1 from the first speed V1 to the second speed V2 when the mobile object 1 is moving on a roadway, the contact portion is recognized within a predetermined range from the mobile object 1, and a road situation is the predetermined state (a further question may be performed for checking). Instead of this, when the foregoing conditions are satisfied in mode B, the controller 140 may make a suggestion using the conversation device 20 so that the speed is brought closer to the second speed V2 through a manual manipulation simply using the accelerator pedal AP or the brake pedal BP. For example, the controller 140 causes the conversation device 20 to output a vocal sound "Please reduce speed if you enter sidewalk." The definition of the predetermined state is similar to that of mode A.

FIG. 7 is a flowchart illustrating an example of a flow of a process performed by the control device 100 according to the embodiment. In the process of the flowchart, mode A is a premise. The process of the flowchart is performed repeatedly, for example, at predetermined time intervals.

First, the road type recognizer 120 determines whether the mobile object 1 is moving on a roadway (or is moving on a sidewalk) (step S200). When it is determined that the mobile object 1 is moving on the roadway, the controller 140 performs control of the case in which the mobile object 1 is moving on the roadway, as described above (step S202). Subsequently, based on a recognition result of the contact portion recognizer 130, the controller 140 determines whether the contact portion CP is within the predetermined range in the traveling direction of the mobile object 1 (step S206). When the controller 140 determines that the contact portion CP is within the predetermined range in the traveling direction of the mobile object 1, the controller 140 determines whether the road situation is the predetermined state based on information supplied from the acquirer 110 (step S208). When the controller 140 determines that the road situation is the predetermined state, the controller 140 performs the specific speed control (step S210).

When a negative determination result is obtained in step S206 or S208, the process of one routine of the flowchart ends. When it is determined in step S200 that the mobile object 1 is moving on the sidewalk, the controller 140 performs control of the case in which the mobile object 1 is moving on the sidewalk (step S204).

According to the above-described first embodiment, it is possible to appropriately control a mobile object capable of moving on both a roadway and a sidewalk at the time of entrance to a sidewalk from a roadway. The "predetermined state" is a state in which maneuvering of the mobile object 1 is difficult or beyond control or a situation in which the occupant P may feel stress is expected. Accordingly, when the road situation is in the predetermined state, a probability of the mobile object 1 entering a sidewalk when the occupant manipulates the steering wheel WH in the approaching contact portion CP is estimated to increase. Incidentally, there is a difference between the first speed V1 which is the speed of the upper limit or a target speed on a roadway and the second speed V2 which is the upper limit of the speed or a target speed on a sidewalk. Therefore, when the mobile object 1 moving at the first speed V1 abruptly enters a sidewalk, a scenario in which sudden deceleration has to be performed can occur. When turning to enter a sidewalk is started during movement at the first speed V1 which is a relatively high speed, there is concern of a large lateral acceleration occurring. That is, there is a possibility of deceleration being late after steering actually starts.

On the other hand, the control device 100 according to the embodiment can inhibit the foregoing sudden deceleration or sudden turning from occurring because of bringing of a speed of the mobile object closer to the second speed V2 when the mobile object 1 is moving on a roadway, the contact portion CP is recognized within the predetermined range in the traveling direction of the mobile object 1, and the road situation is in the predetermined state. As a result, it is possible to perform appropriate control at the time of entrance from a roadway to a sidewalk.

Second Embodiment

Hereinafter, a second embodiment will be described. The control device 100 of the second embodiment is different from that of the first embodiment in the function of the road type recognizer 120. The road type recognizer 120 according to the second embodiment recognizes whether the mobile object 1 is traveling on a roadway or a sidewalk, for example, in response to a manipulation of an occupant on a road type input switch (not illustrated) provided in the mobile object. The road type input switch is provided in, for example, a boss section or the like of the steering wheel WH. The road type input switch includes, for example, a mechanism which can be manipulated to upper and lower sides and maintain a manipulated position, indicates a roadway when the road type input switch is manipulated to the upper side, and indicates a sidewalk when the road type input switch is manipulated to the lower side. The road type input switch may be of a button or GUI switch type. When the road type input switch is manipulated in a state in which the control device 100 recognizes that the mobile object is traveling on a sidewalk, the recognition may be switched to recognition during traveling on a sidewalk. When the road type input switch is manipulated in a state in which the control device 100 is traveling on a roadway, the recognition may be switched to recognition during traveling on a roadway. In this configuration, since the function of automatically recognizing whether the mobile object 1 is traveling on a roadway or a sidewalk can be omitted, it is possible to reduce a processing load or cost. Here, since there is a possibility of an erroneous manipulation by an occupant, the external report device 50 preferably reports information to the outside in the second embodiment.

Others

In the foregoing embodiments, the controller 140 may perform the control of only one of mode A and mode B. That is, the mobile object 1 may perform the speed assistance mode and may not perform the manual mode, or may perform the manual mode and may not perform the speed assistance mode. The controller 140 may perform the control of both mode A and mode B, but may perform the specific speed control only when one of mode A and mode B is performed. In any case, whether to perform the control of mode C may be arbitrarily determined.

The embodiments for carrying out the present invention have been described above, but the present invention is not limited to the embodiments. Various modifications and substitutions can be made within the scope of the present invention without departing from the gist of the present invention.

What is claimed is:

1. A mobile object control device for a mobile object capable of moving on both a roadway and a sidewalk, comprising:
   a storage device storing a program; and
   a hardware processor,
   wherein the hardware processor executes the program stored in the storage device to:
   acquire information indicating a road situation of the roadway in a traveling direction of the mobile object which is moving on the roadway;
   recognize whether the mobile object is moving on the roadway or the sidewalk;
   recognize presence of a contact portion between the sidewalk and the roadway in the traveling direction of the mobile object, the contact portion being provided at a boundary between the sidewalk and the roadway, the contact portion being a portion in which a load is less than in other portions of the boundary when the mobile object passes through;
   control the speed of the mobile object at least partially;
   limit a speed at which the mobile object is moving on the roadway to a first speed;
   limit a speed at which the mobile object is moving on the sidewalk to a second speed slower than the first speed; and
   bring a speed of the mobile object closer to the second speed when the mobile object is moving on the roadway, the contact portion is recognized within a first predetermined range from the mobile object in the traveling direction of the mobile object, and the road situation is in a predetermined state within a second predetermined range from the mobile object in the traveling direction of the mobile object, the first predetermined range being shorter than or the same as the second predetermined range,
   wherein the hardware processor determines that the road situation is a predetermined state when it is recognized based on the acquired information that a speed of another mobile object moving in the same direction as the mobile object is greater than a threshold A within the second predetermined range in the traveling direction of the mobile object.

2. The mobile object control device according to claim 1, wherein the hardware processor questions about an intention to enter the sidewalk using an interface device when the mobile object is moving on the roadway, the contact portion is recognized within the first predetermined range from the mobile object, and the road situation is a predetermined state, and a speed of the mobile object is brought closer to the second speed when a positive response is obtained.

3. The mobile object control device according to claim 1, wherein the hardware processor determines that the road situation is a predetermined state when it is recognized based on the acquired information that a dead end is within the second predetermined range in the traveling direction of the mobile object.

4. The mobile object control device according to claim 1, wherein the hardware processor determines that the road situation is a predetermined state when it is recognized based on the acquired information that a construction site is within the second predetermined range in the traveling direction of the mobile object.

5. The mobile object control device according to claim 1, wherein the hardware processor determines that the road situation is a predetermined state when it is recognized based on the acquired information that traffic congestion occurs within the second predetermined range in the traveling direction of the mobile object.

6. The mobile object control device according to claim 1, wherein the hardware processor determines that the road situation is a predetermined state when it is recognized based on the acquired information that a predetermined number of types or more of mobile objects coexist within the second predetermined range in the traveling direction of the mobile object.

7. The mobile object control device according to claim 1, wherein the hardware processor determines that the road situation is a predetermined state when it is recognized based on the acquired information that the number of large vehicles is equal to or greater than a threshold B within the second predetermined range in the traveling direction of the mobile object.

8. The mobile object control device according to claim 1, wherein the hardware processor recognizes whether the mobile object is moving on the roadway or the sidewalk based on an output of an outside world detection device detecting an outside situation of the mobile object.

9. The mobile object control device according to claim 1, wherein the hardware processor recognizes whether the mobile object is moving on the roadway or the sidewalk based on a manipulation of an occupant of the mobile object on a switch provided inside the mobile object.

10. The mobile object control device according to claim 1,
wherein, when the hardware processor recognizes that the mobile object is moving on the sidewalk, the hardware processor causes an external report device to report the mobile object which is moving on the sidewalk to the outside of the mobile object.

11. A mobile object control method using a computer controlling a mobile object which is capable of moving both on a roadway and a sidewalk, the method comprising:
acquiring information indicating a road situation of the roadway in a traveling direction of the mobile object which is moving on the roadway;
recognizing whether the mobile object is moving on the roadway or the sidewalk;
recognizing presence of a contact portion between the roadway and the sidewalk in the traveling direction of the mobile object, the contact portion being provided at a boundary between the sidewalk and the roadway, the contact portion being a portion in which a load is less than in other portions of the boundary when the mobile object passes through;
controlling the speed of the mobile object at least partially;
limiting a speed at which the mobile object is moving on the roadway to a first speed;
limiting a speed at which the mobile object is moving on the sidewalk to a second speed slower than the first speed; and
bringing the speed of the mobile object closer to the second speed when the mobile object is moving on the roadway, the contact portion is recognized within a first predetermined range from the mobile object in the traveling direction of the mobile object, and the road situation is a predetermined state within a second predetermined range from the mobile object in the traveling direction of the mobile object, the first predetermined range being shorter than or the same as the second predetermined range,
wherein the method further comprises determining that the road situation is a predetermined state when it is recognized based on the acquired information that a speed of another mobile object moving in the same direction as the mobile object is greater than a threshold A within the second predetermined range in the traveling direction of the mobile object.

12. The mobile object control device according to claim 1
wherein the hardware processor suggests deceleration to an occupant of the mobile object using an interface device when the mobile object is moving on the roadway, the contact portion is recognized within the first predetermined range from the mobile object, and the road situation is in a predetermined state.

13. The mobile object control method according to claim 11, further comprising
suggesting deceleration to the occupant using an interface device when the mobile object is moving on the roadway, the contact portion is recognized within the first predetermined range from the mobile object, and the road situation is in a predetermined state.

* * * * *